(12) United States Patent
Kwak (10) Patent No.: US 8,828,593 B2
(45) Date of Patent: Sep. 9, 2014

(54) LITHIUM ION BATTERY HAVING EMERGENCY RUPTURE MEMBER

(75) Inventor: Yoontai Kwak, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 279 days.

(21) Appl. No.: 12/713,402

(22) Filed: Feb. 26, 2010

(65) Prior Publication Data
US 2011/0003194 A1  Jan. 6, 2011

(51) Int. Cl.
*H01M 2/00* (2006.01)

(52) U.S. Cl.
USPC ............. 429/163; 429/175; 429/185; 429/53

(58) Field of Classification Search
USPC ........... 429/185, 186, 176, 175, 163, 174, 65, 429/57, 53, 56
See application file for complete search history.

(56) References Cited

U.S. PATENT DOCUMENTS

| 2003/0077505 | A1 | 4/2003 | Goda et al. |
| 2003/0131880 | A1* | 7/2003 | Marubayashi et al. .... 137/68.27 |
| 2004/0259408 | A1 | 12/2004 | Ashibe et al. |
| 2009/0220850 | A1 | 9/2009 | Bitsche et al. |
| 2009/0305114 | A1 | 12/2009 | Yeo |
| 2011/0020674 | A1* | 1/2011 | Fujita .............................. 429/53 |

FOREIGN PATENT DOCUMENTS

| EP | 1 321 993 A2 | 6/2003 |
| JP | U 5-90809 | 12/1993 |
| JP | 2003-308873 | 10/2003 |
| JP | 2003-346761 A | 12/2003 |
| JP | 2006-037129 A | 2/2006 |
| JP | 2009-004271 A | 1/2009 |
| JP | 2009-295576 A | 12/2009 |
| KR | 10-2004-0111105 | 12/2004 |
| KR | 10-2006-0027270 | 3/2006 |
| KR | 10-2006-0086720 | 8/2006 |
| KR | 10-2006-0111844 | 10/2006 |
| WO | WO 2006/108529 A1 | 10/2006 |
| WO | WO 2008/018241 A1 | 2/2008 |
| WO | WO 2008/053424 A | 5/2008 |

OTHER PUBLICATIONS

KIPO Office action dated Nov. 23, 2010, for Korean priority Patent application 10-2009-0061331.
Patent Abstracts of Japan and English machine translation of Japanese Publication 2003-308873 listed above, 17 pages.
European Search Report dated Aug. 4, 2010, for corresponding European Patent application 10167851.4.

(Continued)

*Primary Examiner* — Raymond Alejandro
(74) *Attorney, Agent, or Firm* — Christie, Parker & Hale, LLP (57) ABSTRACT

A lithium ion battery is disclosed. The lithium ion battery includes a can, an electrode assembly, and a cap assembly. A relatively thin emergency rupture member is formed on (or at) a bottom (or bottom surface) of the can. The emergency rupture member may have a line shape which is spaced apart from and parallel to a long side of the bottom of the can. Alternatively, the emergency rupture member may be formed on (and/or along) the long side of the bottom. Compressive forces applied to opposite sides of the can in directions parallel to the emergency rupture member cause the can to rupture along the emergency rupture member.

11 Claims, 10 Drawing Sheets

(56) References Cited

OTHER PUBLICATIONS

SIPO Office action dated Aug. 27, 2012, for corresponding Chinese Patent application 201010198287.5, with English translation, (16 pages).
JP Office Action dated Feb. 5, 2013 for JP Application No. 2010-132389 (2 pages).
Machine English Translation of JP 5-90809 (10 pages).
Patent Abstracts of Japan, Machine English Translation of JP 2003-346761 A (27 pages).
JPO Office action dated Feb. 25, 2014, for corresponding Japanese Patent Application No. 2010-132389, (3 pages).

* cited by examiner

LITHIUM ION BATTERY HAVING EMERGENCY RUPTURE MEMBER

CROSS-REFERENCE TO RELATED APPLICATION

This application claims priority to and the benefit of Korean Patent Application No. 10-2009-0061331, filed on Jul. 6, 2009, the entire content of which is incorporated herein by reference.

BACKGROUND

1. Field of the Invention

An embodiment of the present invention relates to a lithium ion battery.

2. Description of the Related Art

A secondary battery is reusable because it can be charged and recharged as compared with a primary battery that should not be charged and recharged and is disposable. Due to its reusability, the secondary battery may be employed as a power source for a computer (e.g., a laptop computer), a portable communication device (e.g., a mobile phone and a camcorder), etc.

Electric vehicles have been under development to reduce the environmental pollution due to exhaust gas from vehicles utilizing internal combustion engines. In order to apply the secondary battery to an electric vehicle, the development of an economical, high-speed chargeable, stable, and high-energy capacity secondary battery is desired.

A secondary battery can be classified as either a lead battery, a nickel/cadmium (Ni/Cd) battery, a nickel/metal hydride (Ni/MH) battery or a lithium ion battery according to its negative electrode material and/or positive electrode material. Potential and energy density of the secondary battery is determined by properties of the electrode material. The lithium ion battery with its lithium electrode material can be used as a power source for a portable electronic device and for an electric vehicle because the energy density of lithium is relatively high due to a low redox potential and low molecular weight.

SUMMARY OF THE INVENTION

An aspect of an embodiment of the present invention is directed toward a lithium ion battery having improved stability (or safety) under longitudinal compression.

According to an embodiment of the present invention, a lithium ion battery includes: a can; an electrode assembly accommodated in the can; and a cap assembly configured to seal the can; wherein the can includes a relatively thin emergency rupture member formed on (or at) a bottom surface thereof.

The emergency rupture member may be spaced apart from and parallel to a long side of the bottom.

The emergency rupture member may be formed on a long side of the bottom.

The emergency rupture member may have a continuous line shape.

The emergency rupture member may have a dotted line shape.

The emergency rupture member may include a pair of emergency rupture members to be spaced apart from and parallel to each other.

The emergency rupture member may be a notch or a trench to be spaced apart from and parallel to a long side of the bottom.

The emergency rupture member may be a step formed on a long side of the bottom.

The emergency rupture member may have a step formed on a long side of the bottom.

The emergency rupture member may have a depth between about 0.1 mm and about 0.45 mm.

The emergency rupture member may be formed on an external surface of the bottom.

In one embodiment, the can has a pair of wide side surfaces vertically extended from long sides of the bottom; and the emergency rupture member is formed in a boundary region between the bottom and the wide side surfaces.

The can may have a pair of narrow side surfaces vertically extended from short sides of the bottom; and the emergency rupture member is separated (or slit open) when the narrow side surfaces are compressed toward each other.

As such, in a lithium ion battery of an embodiment of the present invention, the emergency rupture member (or portion) is formed on a long side of the bottom of the can so that stability (or safety) under longitudinal compression is enhanced. In other words, the emergency rupture member formed on a long side of the bottom of the can is rapidly and definitely separated so that the lithium ion battery has improved stability under longitudinal compression.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Figure 1A:
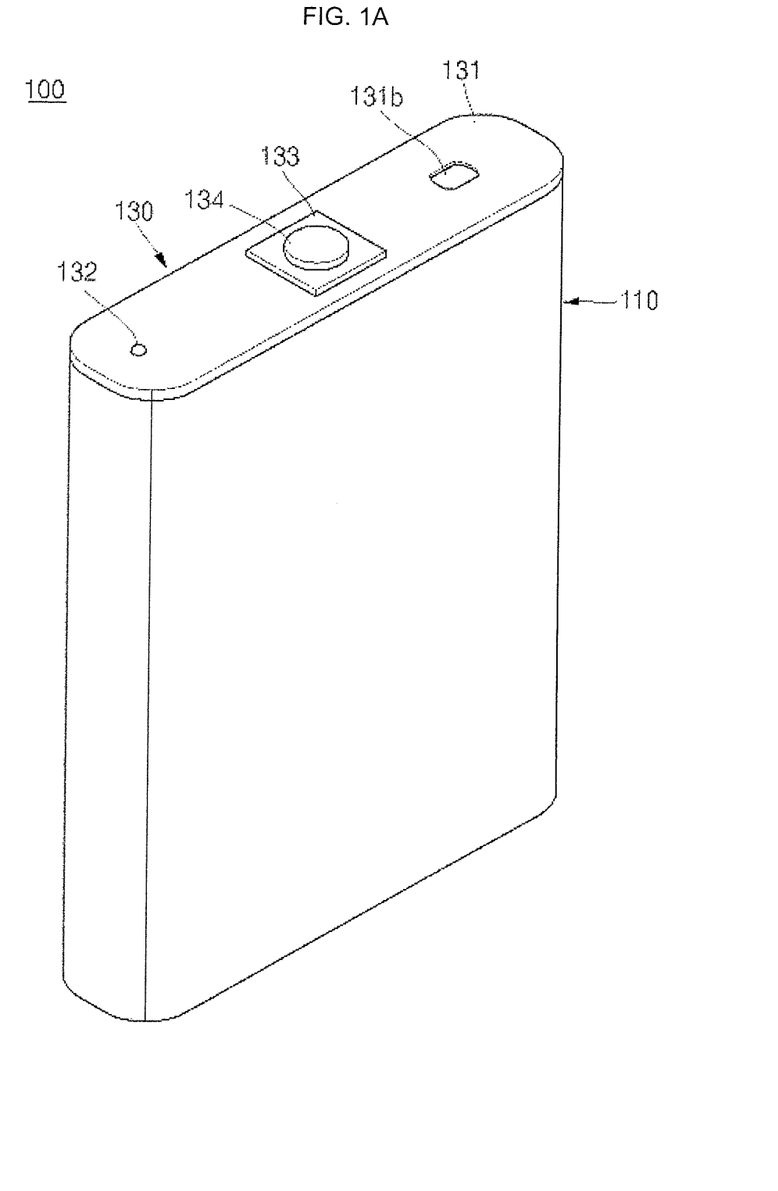
FIGS. 1A and 1B are schematic top and bottom perspective views illustrating a lithium ion battery according to an embodiment of the present invention.
Figure 1B:
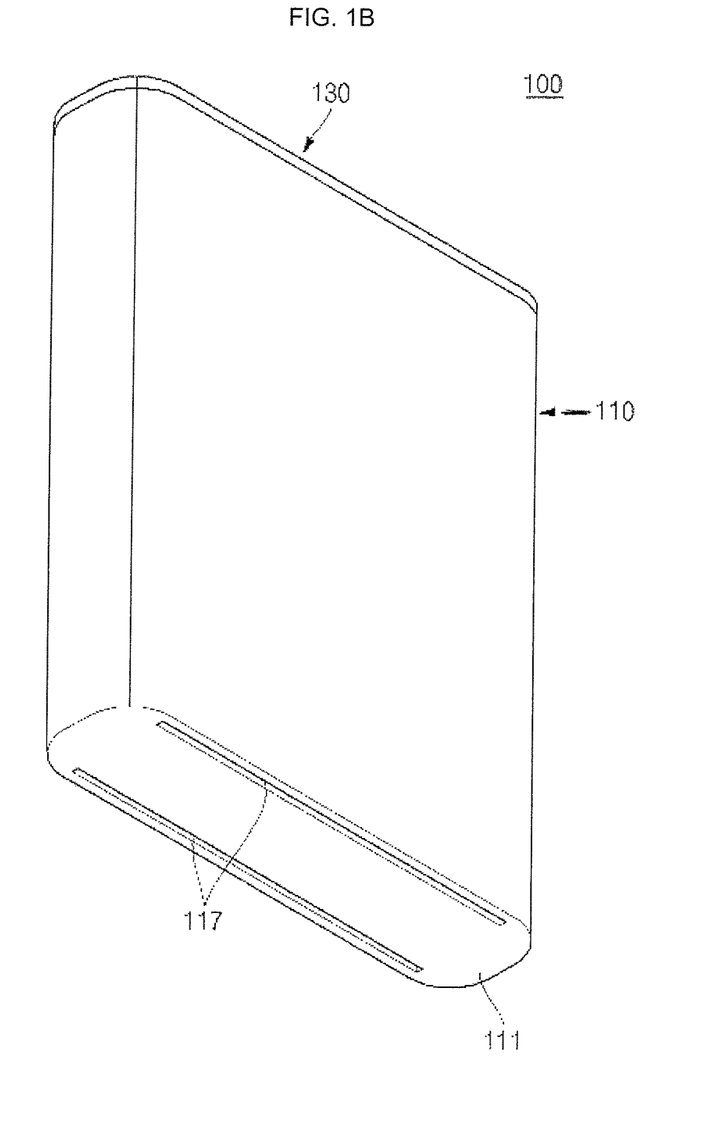

FIGS. 1A and 1B are schematic top and bottom perspective views illustrating a lithium ion battery 100 according to an embodiment of the present invention.

As shown in FIGS. 1A and 1B, the lithium ion battery 100 includes a can 110 having an approximately hexahedral shape and a cap assembly 130 coupled to the top of the can 110.

The can 110 includes a bottom 111 and a pair of emergency rupture members 117 formed on (or at) the bottom 111. Here, in one embodiment, the pair of emergency rupture members are configured to easily and definitely separate or rupture during a longitudinal compression of the lithium ion battery 100. The structure and functions of the emergency rupture members 117 will be described in more detail below.

The cap assembly 130 includes a cap plate 131 coupled to the can 110. A relatively thin safety vent 131b may be formed on (or at) the cap plate 131. The safety vent 131b is ruptured when an internal pressure of the can 110 is higher than a reference pressure of the can 110 so that internal gases are discharged to the outside. A plug 132 may be coupled to the cap plate 131 to plug an electrolyte inlet. Further, an electrode terminal 134 is coupled to the cap plate 131 by interposing a gasket 133 therebetween. Although a single electrode terminal 134 is depicted in the drawings, a plurality of electrode terminals 134 may be provided.

Figure 2A:
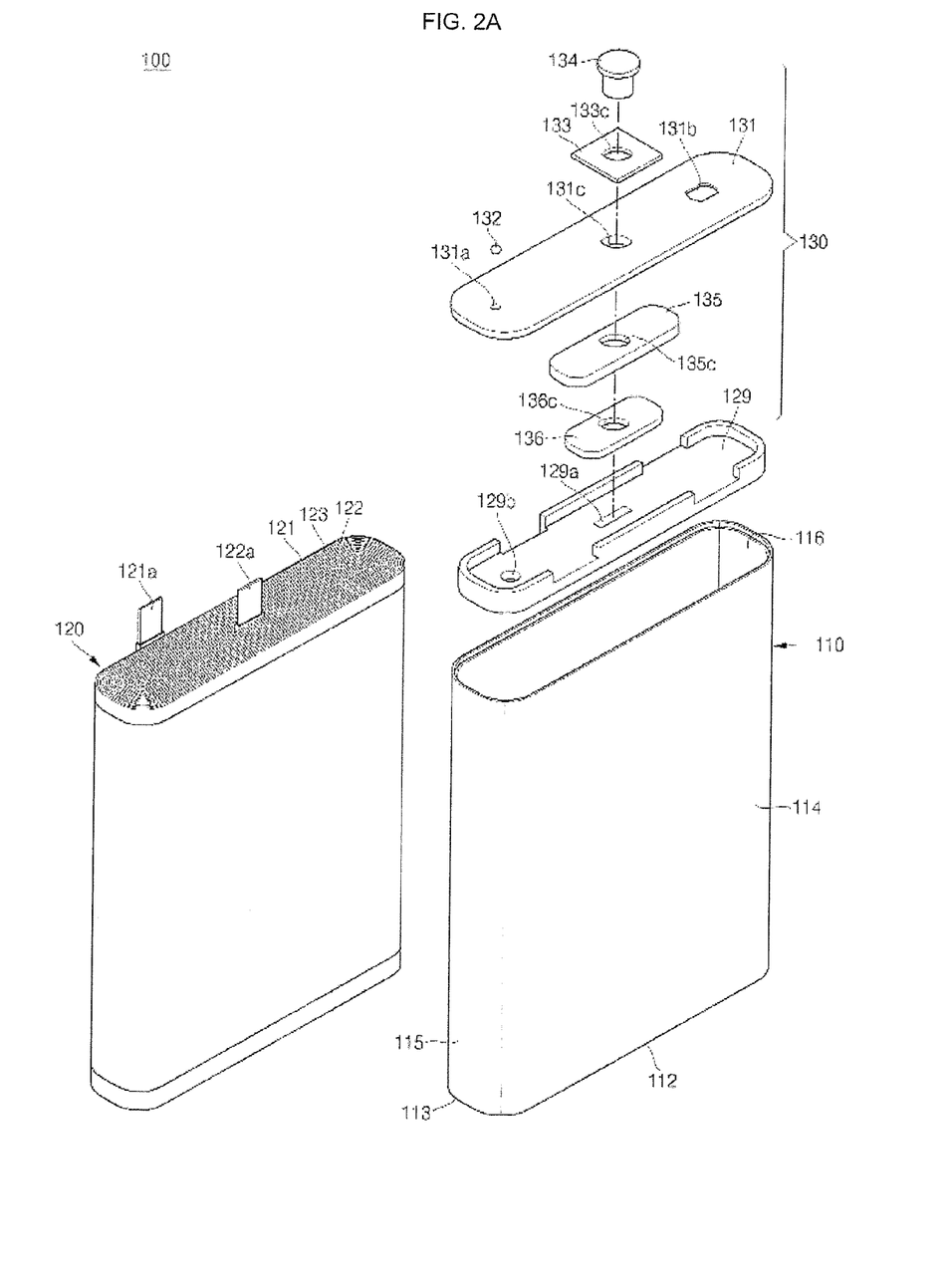
FIGS. 2A and 2B show a schematic exploded perspective view and a schematic front sectional view of the lithium ion battery according to the embodiment of the present invention, respectively.
Figure 2B:
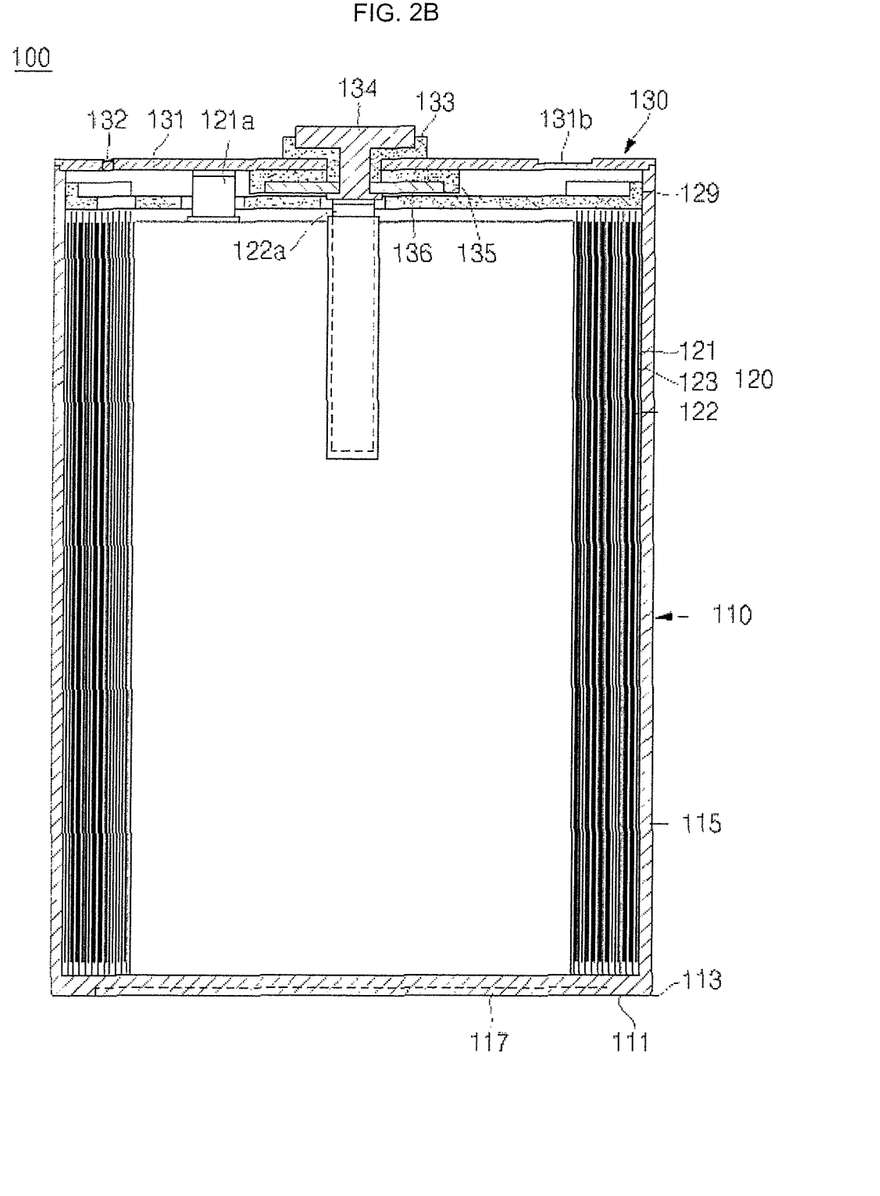

FIGS. 2A and 2B show a schematic exploded perspective view and a schematic front sectional view of the lithium ion battery 100.

As shown in FIGS. 2A and 2B, the lithium ion battery 100 includes the can 110, an electrode assembly 120 accommodated in the can 110, electrolyte injected into the can 110 to enable movement of lithium ions, and the cap assembly 130 for closing or sealing the can 110 to prevent or block the electrode assembly 120 and the electrolyte from being separated from the can 110.

The can 110 includes the bottom 111, a pair of wide side surfaces 114, and a pair of narrow side surfaces 115. The bottom 111 has a pair of long sides 112 and a pair of short sides 113. Moreover, the bottom 111 has a pair of emergency rupture members 117 on (or at) the lower side (an external surface) of the bottom 111. The wide side surfaces 114 extend from the long side 112 of the bottom 111 in an approximately perpendicular direction, and the narrow side surfaces 115 extend from the short side 113 of the bottom 111 in an approximately perpendicular direction. The wide side surfaces 114 and the narrow side surfaces 115 are connected with each other. An opening 116 is formed on the top of the can 110 to expose the bottom of the can 110. In other words, the can 110 has an approximately hollow rectangular shape having an open top. The can 110 may be made of aluminum (Al), iron (Fe), an aluminum and iron alloy, and/or an equivalent material thereof, but the materials of the present invention are not limited to these.

The electrode assembly 120 includes a positive electrode plate 121 on which a positive electrode active material such as lithium cobalt oxide ($LiCoO_2$) is coated, a negative electrode plate 122 on which a negative electrode active material such as graphite is coated, and a separator 123 disposed between the positive electrode plate 121 and the negative electrode plate 122 to prevent or reduce electric shorts and to enable movement of lithium ions. The positive electrode plate 121, the negative electrode plate 122, and the separator 123 are wound several times into a jelly roll shape, and then accommodated in the can 110. The positive electrode plate 121 may be made of aluminum (Al) foil, the negative electrode plate may be made of copper (Cu) foil, and the separator 123 may be made of polyethylene (PE) or polypropylene (PP), but the present invention is not limited to these. An upwardly extended positive lead 121a is coupled to the positive electrode plate 121, and an upwardly extended negative lead 122a is coupled to the negative electrode plate 122. The positive lead 121a may be made of aluminum (Al), and the negative lead 122a may be made of nickel (Ni), but the present invention is not limited to these materials.

The electrolyte is injected into the can 110, and is positioned between the positive electrode plate 121 and the negative electrode plate 122 of the electrode assembly 120. The electrolyte serves as a medium through which lithium ions generated due to the electrochemical reactions between the positive electrode plate 121 and the negative electrode plate 122 during charging and discharging of the battery move. The electrolyte may be a non-aqueous organic electrolyte such as a mixture of lithium salt and highly pure organic solvents. Further, the electrolyte may be made of polymeric materials.

An insulating case 129 may additionally be coupled to the opening 116 of the can 110 as the top of the electrode assembly 120. A lead through-hole 129a may be formed in the insulation case 129 such that the negative electrode lead 122a passes through the lead hole 129a. An electrolyte inlet 129b may be formed in the insulation case 129 such that an electrolyte injected through the cap plate 131 may easily be flowed into the electrode assembly 120.

The cap assembly 130 includes the cap plate 131, the plug 132, the insulation gasket 133, the electrode terminal 134, an insulation plate 135, and a terminal plate 136. The cap plate 131 is coupled to the opening 116 of the can 110 and has a plate shape with long and short sides. An electrolyte injection hole 131a is formed into the cap plate 131 at a first portion of the cap plate 131. The plug 132 plugs the electrolyte injection hole 131a. Further, a relatively thin safety vent 131b is formed with the cap plate 131 at a second portion of the cap plate 131. The insulation gasket 133 is disposed on a hole 131c formed approximately in the center of the cap plate 131. The electrode terminal 134 is inserted into a hole 133c formed in the center of the insulation gasket 133. The negative lead 122a may be connected to the lower surface of the electrode terminal 134. The positive lead 121a may be connected to the lower surface of the cap plate 131, or vice versa. The insulation plate 135 is positioned on the lower surface of the cap plate 131, and the insulation gasket 133 is inserted into a hole 135c of the insulation plate 135. The electrode plate 136 is positioned on the lower surface of the insulation plate 135, and the electrode terminal 134 is inserted into a hole 136c of the electrode plate 136.

Figure 3:
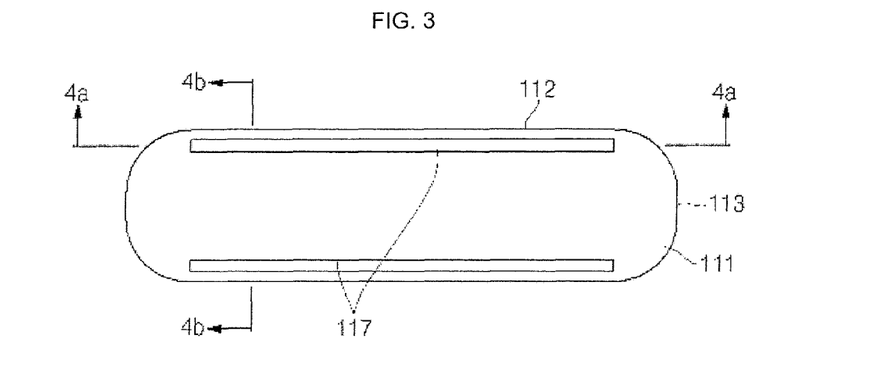
FIG. 3 is a schematic bottom view illustrating the lithium ion battery according to the embodiment of the present invention.

FIG. 3 is a schematic bottom view illustrating the lithium ion battery 100.

As shown in FIG. 3, the bottom 111 of the can 110 includes the pair of long sides 112 and the pair of short sides 113 connecting the ends of the long sides 112 to each other. The long sides 112 may be straight, and the short sides may be rounded (or curved), but the present invention is not limited to those configurations. Further, two emergency rupture members 117, which are spaced apart from and parallel to the long sides 112, are formed in the lower surface of the bottom 111 of the can 110. In other words, each of the emergency rupture members has an approximately solid line shape. The distance between one emergency rupture member 117 of the emergency rupture members 117 and the nearest long side 112 adjacent to the one emergency rupture member 117 is much shorter than the distance between the pair of emergency rupture members 117. Namely, each of the emergency rupture members 117 is relatively close to its corresponding long side 112. Therefore, when the narrow side surfaces (including short sides 113) are compressed toward the center of the can 100 (referred to as longitudinal compression), stresses are concentrated onto the emergency rupture members 117 so that the emergency rupture members 117 are separated from the can 110 and then the wide side surfaces become more distant from the center of the can 110. Since the emergency rupture members 117 are swiftly and definitely separated during the longitudinal compression, the stability of the can 110 under longitudinal compression is improved.

In one embodiment, the emergency rupture members 117 are also formed in regions corresponding to the short sides 113 as well as the long sides 112.

Figure 4A:
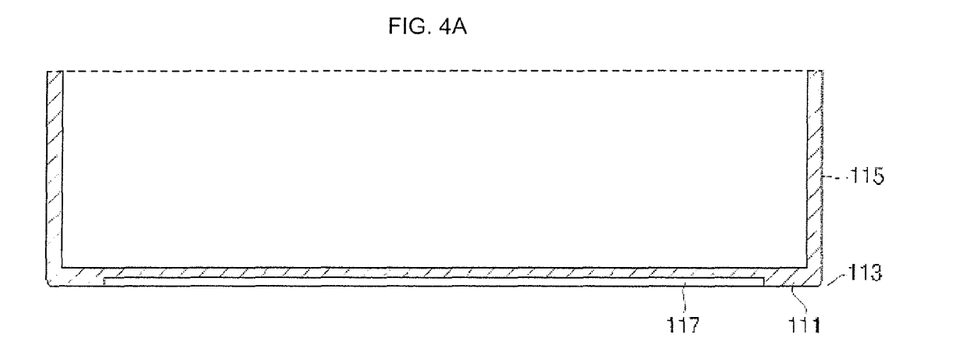
FIGS. 4A and 4B show schematic sectional views respectively taken along the lines 4a-4a and 4b-4b of FIG. 3.
Figure 4B:
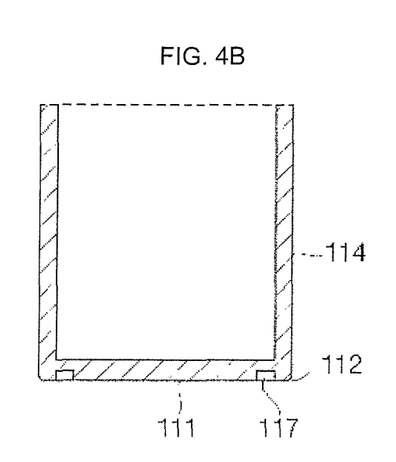

FIGS. 4A and 4B show schematic sectional views respectively taken along the lines 4a-4a and 4b-4b of FIG. 3.

As shown in FIGS. 4A and 4B, the emergency rupture members 117 may be in the forms of a plurality of notches or trenches spaced apart from and parallel to their respective long sides 112. Referring to FIG. 4B, each of the emergency rupture members 117 has a rectangular sectional shape and/or a step on its corresponding long side 112 of the bottom 111, but the present invention is not limited thereto. The cross section of each of the emergency rupture members 117 may be one of a triangular shape, a rectangular shape, a trapezoidal shape, a semicircular shape, and/or an equivalent shape thereof.

The emergency rupture members 117 may have a depth of approximately 20% to 90% of the average thickness of the bottom 111. In one embodiment, when the depth of the emergency rupture members 117 is less than 20% of the thickness of the bottom 111, the emergency rupture members 117 may be separated too late during the longitudinal compression. On the contrary, in another embodiment, when the depth of the emergency rupture members 117 exceeds 90% of the thickness of the bottom 111, the emergency rupture members 117 may be separated too early.

In one embodiment, when the thickness of the bottom surface is about 5 mm, the thickness of the emergency rupture members 117 is between about 0.1 mm and about 0.45 mm, but the present invention is not limited to this.

The can is manufactured by deep drawing so that the bottom 111 is relatively thicker than thicknesses of the wide side surfaces 114 and the narrow side surfaces 115. However, since the relatively thin emergency rupture members are formed on (or at) the lower surface of the bottom 111, the bottom 111 may be easily ruptured during longitudinal compression.

Figure 5:
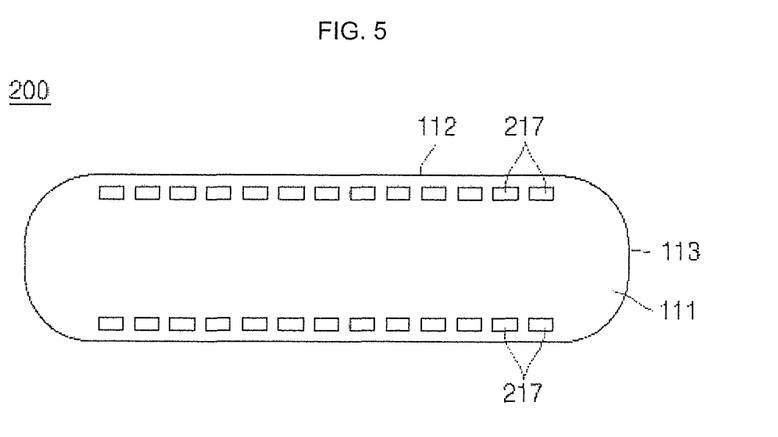
FIG. 5 is a schematic bottom view illustrating a lithium ion battery according to another embodiment of the present invention.

FIG. 5 is a schematic bottom view illustrating a lithium ion battery according to another embodiment of the present invention.

As shown in FIG. 5, each of the emergency rupture members 217 may have individual portions that are spaced apart from each other, and from and parallel to the long sides 112 of the bottom 111 in the form of a dotted line (or to have a dotted line shape). Each of the emergency rupture members 217 does not have a continuous line shape but a non-continuous line shape (or dotted line shape). By doing so, a separation (or rupture) time of the emergency rupture members 217 of the lithium ion battery 200 may be more precisely controlled during the longitudinal compression. When the pitches (or separations) of the individual portions of each of the emergency rupture members 217 are adjusted, the separation time of the emergency rupture members 217 suitable for characteristics of a battery may be controlled.

Figure 6A:
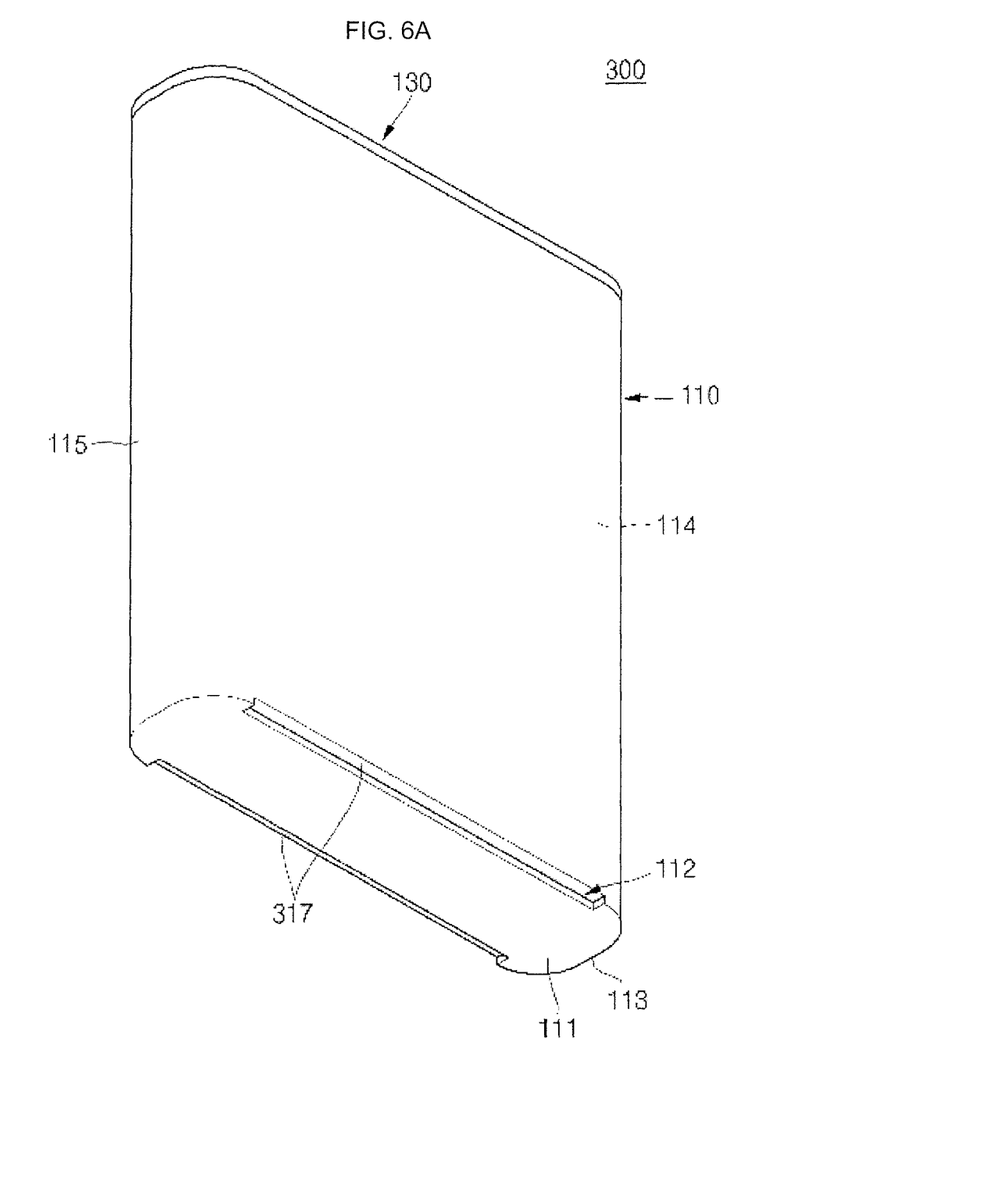
FIGS. 6A and 6B show a schematic bottom perspective view and a partial sectional view of a lithium ion battery according to still another embodiment of the present invention, respectively.
Figure 6B:
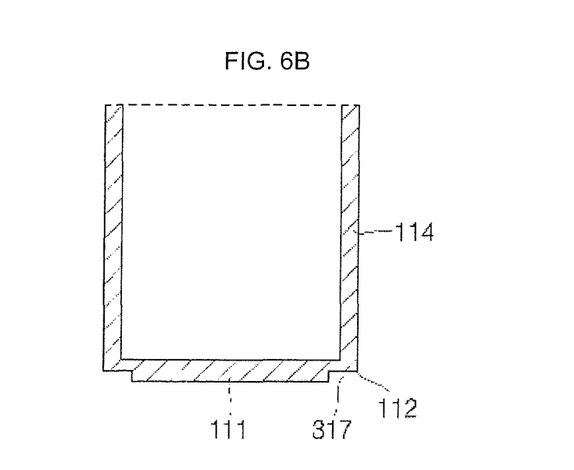

FIGS. 6A and 6B show a schematic bottom perspective view and a partial sectional view of a lithium ion battery according to still another embodiment of the present invention.

As shown in FIGS. 6A and 6B, emergency rupture members 317 may be formed along the long sides 112 of the bottom 111. In other words, the emergency rupture members 317 may be formed directly on the long sides 112 of the bottom 111. Two emergency rupture members may be formed since there are two long sides 112 of the bottom 111.

The long sides 112 of the bottom 111 are boundary lines connected to the wide side surfaces 114 so that the emergency rupture members 317 are commonly formed in the boundary regions between the bottom and the wide side surfaces 114. The thinnest portions of the emergency rupture members 317 are formed on the bottom 111 so that the bottom 111 may be easily separated (or ruptured) during the longitudinal compression of the can 111.

By doing so, in the lithium ion battery 300, the emergency rupture members 317 that are formed in the boundary regions between the bottom 111 and the wide side surfaces 114 may be separated. Since the emergency rupture members 317 are formed in the boundary regions between the bottom 111 and the wide side surfaces 114 that are the weakest portions to a stress, the stability (or safety) of the battery during the longitudinal compression is enhanced.

Figure 7:
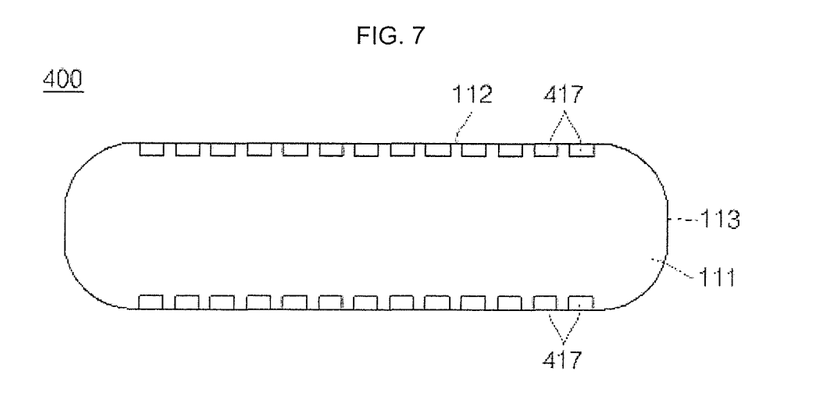
FIG. 7 is a schematic bottom view illustrating a battery according to still another embodiment of the present invention.

FIG. 7 is a schematic bottom view illustrating a battery according to still another embodiment of the present invention.

As shown in FIG. 7, each of the emergency rupture members 417 may be formed to have a dotted line shape along the boundary regions between the bottom 111 and the wide side surfaces 114. In other words, each of the emergency rupture members 417 does not have a continuous line shape but a non-continuous line shape (or a dotted line shape). By doing so, a separation time of the emergency rupture members 417 of a lithium ion battery 400 may be more precisely controlled during the longitudinal compression. That is, when pitches of individual portions of each of the emergency rupture members 417 are adjusted, the separation time of the emergency rupture members 417 suitable for characteristics of a battery may be controlled.

Figure 8A:
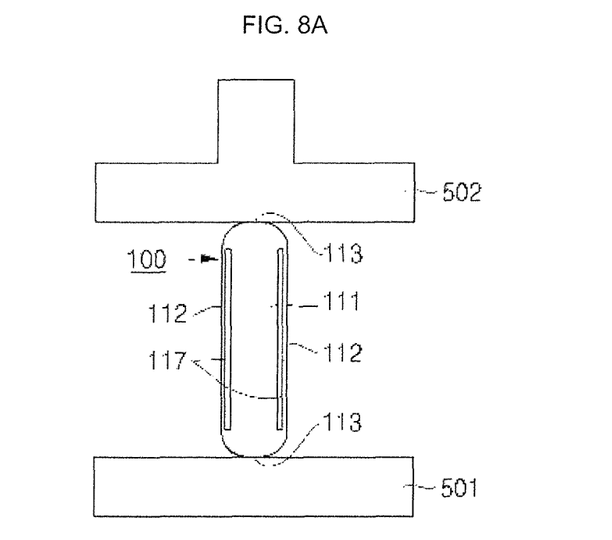
FIGS. 8A and 8B show views illustrating a longitudinal compression test method of a lithium ion battery having emergency rupture members and a result of the test.
Figure 8B:
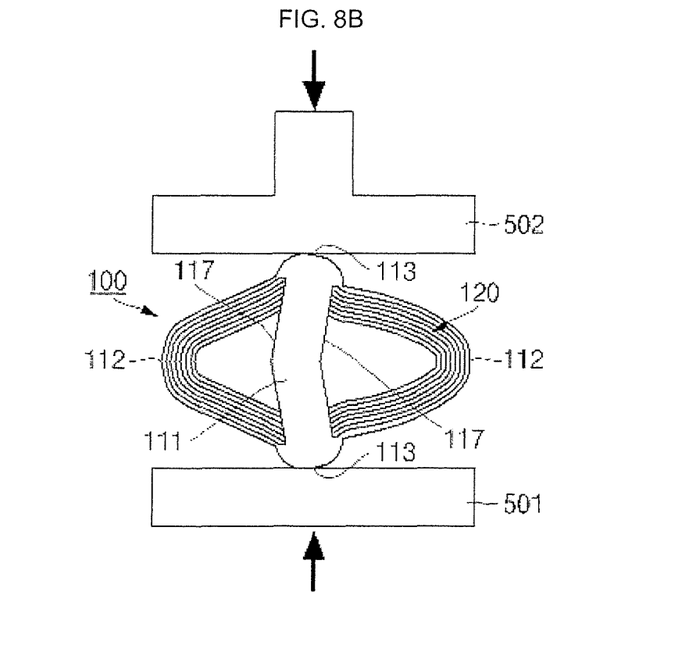

FIGS. 8A and 8B show views illustrating a longitudinal compression test method of a lithium ion battery having emergency rupture members and a result of the test.

As shown in FIG. 8A, the lithium ion battery 100 having the emergency rupture members 117 is placed between a lower die 501 and an upper die 502 in the vertical direction. That is, the narrow side surfaces 115 of the lithium ion battery 100 contact the lower die 501 and the upper die 502, respectively. In other words, the narrow side surfaces 115 of the can 110 contact the lower die 501 and the upper die 502, respectively.

As shown in FIG. 8B, when the lower die 501 and the upper die 502 are driven to approach each other by a force, a stress is concentrated to the emergency rupture members 117 formed on (or at) the bottom 111, and the emergency rupture members 117 are separated (or split open). As a result, the wide side surfaces 114 are deformed to be far away from each other and the electrode assembly 120 in the can 110 is deformed and spreads wide. Not only is the internal gas of the can 110 stably discharged to the outside, but also an electric shock (or short circuit) of the electrode assembly 120 may be reduced or prevented. Therefore, the stability (or safety) of the secondary battery 100 during the longitudinal compression is enhanced.

Figure 9A:
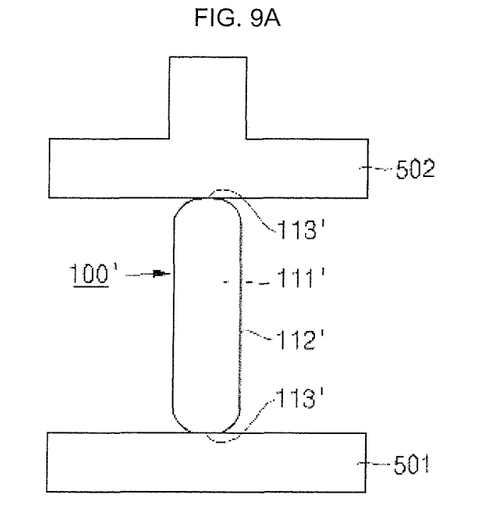
FIGS. 9A and 9B show views illustrating a longitudinal compression test method of a lithium ion battery without an emergency rupture member and a result of the test.
Figure 9B:
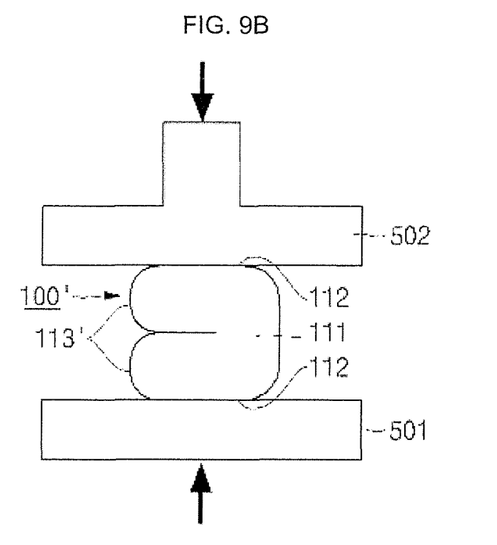

FIGS. 9A and 9B show views illustrating a longitudinal compression test method of a lithium ion battery without an emergency rupture member and a result of the test.

As shown in FIGS. 9A and 9B, when a lithium ion battery 100' without the emergency rupture member is placed between the lower die 501 and the upper die 502, and short sides 113' of the lithium ion battery 100' are compressed under the longitudinal load; the bottom surface 111' is not separated from the can. In other words, long sides 112' forming the bottom 111' are not separated but the lithium ion battery 100' is folded in any suitable direction. In the lithium ion battery 100' without the emergency rupture member, the internal gas of the can is not discharged, and the electrode assembly may be electrically shorted (or short circuited). Resultantly, the lithium ion battery without the emergency rupture member is relatively less stable (or is relatively less safe) during the longitudinal compression.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A lithium ion battery comprising:
    a can having a bottom, a pair of narrow side surfaces opposing each other in a first direction, and a pair of wide side surfaces that are wider than the narrow side surfaces;
    an electrode assembly accommodated in the can; and
    a cap assembly configured to seal the can,
    wherein the bottom comprises a pair of emergency rupture members extending in the first direction,
    wherein the emergency rupture members are closer to the pair of wide side surfaces than to a center axis of the bottom in the first direction,
    wherein the emergency rupture members are configured to split open when the can is subjected to opposing forces in the first direction, wherein the pair of emergency rupture members are spaced apart from and parallel to each other, wherein each of the pair of emergency rupture members has a continuous line shape, and wherein each of the emergency rupture members is on an external surface of the bottom.

2. The lithium ion battery of claim 1, wherein the emergency rupture members are spaced apart from and parallel to a long side of the bottom.

3. The lithium ion battery of claim 1, wherein the emergency rupture member is on a long side of the bottom.

4. The lithium ion battery of claim 1, wherein the emergency rupture member has a dotted line shape.

5. The lithium ion battery of claim 1, wherein each of the pair of emergency rupture members has a plurality of individual portions separated from each other along a line parallel to a long side of the bottom.

6. The lithium ion battery of claim 1, wherein each of the emergency rupture members comprises a notch or a trench spaced apart from and parallel to a long side of the bottom.

7. The lithium ion battery of claim 1, wherein the emergency rupture member has a step on a long side of the bottom.

8. The lithium ion battery of claim 1, wherein each of the emergency rupture members has a depth between about 0.1 mm and about 0.45 mm.

9. The lithium ion battery of claim 1, wherein
    the pair of wide side surfaces vertically extend from long sides of the bottom; and
    the emergency rupture members are formed in a boundary region between the bottom and the wide side surfaces.

10. The lithium ion battery of claim 1, wherein
    the pair of narrow side surfaces vertically extend from short sides of the bottom; and
    the emergency rupture members are configured to split open when the narrow side surfaces are compressed toward each other.

11. A lithium ion battery comprising:
    a can including a bottom surface, a pair of narrow side surfaces opposing each other in a lengthwise direction of the bottom surface, and a pair of wide side surfaces that are wider than the narrow side surfaces, and that has a pair of emergency rupture members extending along over half of the lengthwise direction of the bottom surface;
    an electrode assembly accommodated in the can; and
    a cap assembly configured to seal the can,
    wherein the emergency rupture members are closer to the pair of wide side surfaces than to a center axis of the bottom surface in the lengthwise direction,
    wherein the emergency rupture members are configured to rupture when the narrow side surfaces of the lithium ion battery are compressed along the lengthwise direction of the bottom surface, wherein the pair of emergency rupture members are spaced apart from and parallel to each other, wherein each of the pair of emergency rupture members has a continuous line shape, and wherein each of the emergency rupture members is on an external portion of the bottom surface.

* * * * *